D. M. MORSE.
SHOCK COMPRESSOR.
APPLICATION FILED JULY 22, 1918.

1,281,994.  Patented Oct. 15, 1918.

Inventor
D. M. Morse

UNITED STATES PATENT OFFICE.

DAVID M. MORSE, OF DUNDEE, MICHIGAN.

SHOCK-COMPRESSOR.

1,281,994.  Specification of Letters Patent.  Patented Oct. 15, 1918.

Application filed July 22, 1918. Serial No. 246,041.

*To all whom it may concern:*

Be it known that I, DAVID M. MORSE, a citizen of the United States, residing at Dundee, in the county of Monroe, State of Michigan, have invented certain new and useful Improvements in Shock-Compressors; and I do hereby declare the following to be a full, clear, and exact description of the invention, such as will enable others skilled in the art to which it appertains to make and use the same.

The invention relates to a shock binder and more particularly to the class of shock compressors.

The primary object of the invention is the provision of a device of this character, wherein a shock of corn stalks, or any other kind of grain or foliage that is stacked can be compressed for the convenient bundling thereof and the binding or tying of the same in the shock without excessive labor on the part of the operator, and with despatch.

Another object of the invention is the provision of a device of this character which is capable of easy handling and that will effectively hold the shock in a firmly compressed condition while being tied, thus saving time and labor when forming corn stalks or the like in shocks.

A further object of the invention is the provision of a device of this character which is extremely simple in construction, thoroughly reliable and efficient in its purpose and inexpensive to manufacture.

With these and other objects, the invention consists in the features of construction, combination and arrangement of parts as will be hereinafter fully described, illustrated in the accompanying drawing and pointed out in the claim hereunto appended.

In the accompanying drawing.

Similar reference characters indicate corresponding parts throughout the several views in the drawing.

Figure 1:
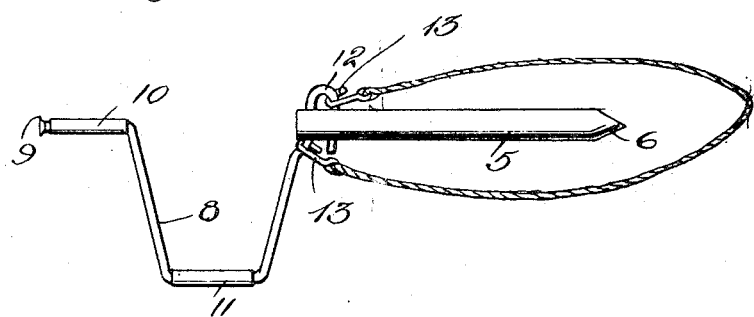
Figure 1, is a fragmentary elevation showing by dotted lines a shock and by full lines the application of the device constructed in accordance with the invention, applied.
Figure 2:
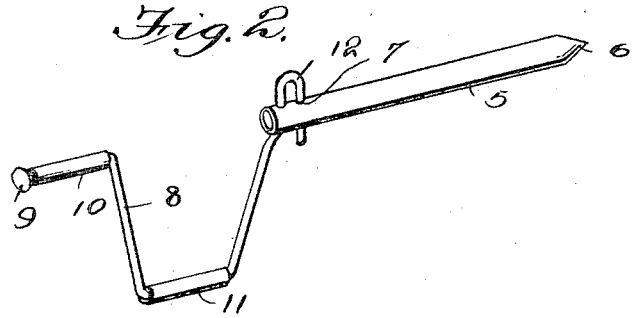
Fig. 2, is a perspective view of the device.
Figure 3:
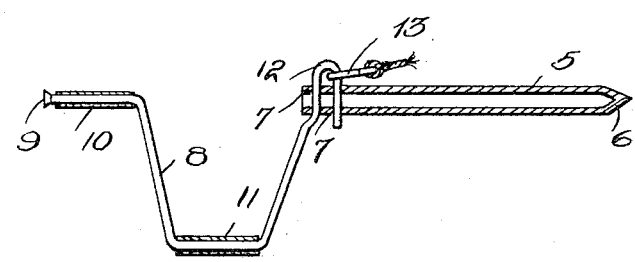
Fig. 3, is a vertical longitudinal sectional view.

Referring to the drawing in detail, the device comprises a tubular pin 5 having a closed pointed end 6, and this pin constitutes a winding drum for the compressing twine for the shock and is operated in a manner presently described.

Formed in the pin 5 near the end remote from the point 6 are diametrically opposed holes 7 for the connection of an operating crank 8, one limb of which is bent to form an extension terminal 9, having rotatably mounted thereon a gripping handle 10, while the crank portion is likewise fitted with a rotatable gripping handle 11 for manually turning the crank for the rotation of the pin 5, in the binding of the shock, in a manner presently described.

The other limb of the crank 8 is bent upon itself to form a hook shaped loop 12 which is engaged in the holes 7 for the fastening of the crank to the pin 5 and constituting a fastening bight for one end of the tie or twine for binding the shock. The ends of the tie or twine are preferably connected with hook members 13. The pin 5 is inserted in the shock to assume a horizontal position, as is clearly shown in Fig. 1, of the drawing, and the hook 13 at one end of the tie or twine is engaged with the loop 12 for the fastening of the same thereto. However, this end of the tie or twine may be knotted or otherwise fastened in the loop 12 and thereby dispensing with the hooks.

Figure 4:
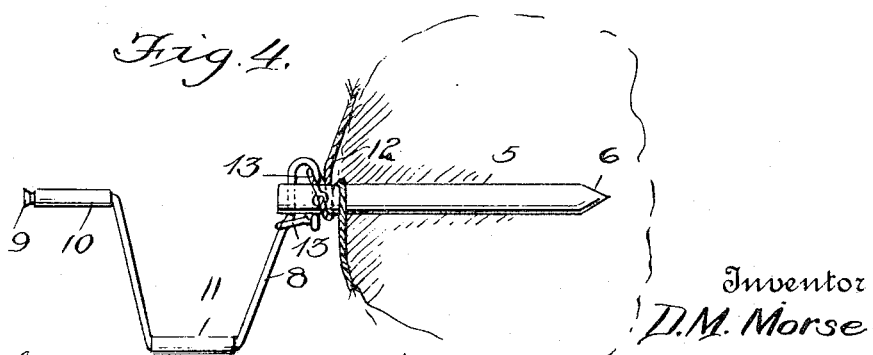
Fig. 4, is a transverse sectional view through the shock showing the device in plan.

The tie or twine is carried or trained about the shock and adapted to be wound on the pin 5, as shown in Fig. 4, of the drawing, upon the rotation of the pin 5 by the crank 8, which is manually turned when gripped by the handles 10 and 11, the other end of the tie or twine has its hooks 13 engaged with the crank at the point shown in Figs. 1 and 4, of the drawing, so that said tie or twine when wound upon the pin will be drawn about the shock compressing the same for the bundling thereof, and the subsequent tying by the twine.

When the shock is compressed the crank 8 is pressed downwardly into the shock to hold it while the tie or twine is joined at its ends in any suitable manner, the device, thereafter being removed from the shock and then taken to another shock for the bundling and tying of the same.

From the foregoing it is thought, that the construction and manner of use of the device will be clearly understood and therefore a more extended explanation has been omitted.

What is claimed is:

A device of the character described, comprising a pointed pin forming a rotatable drum and anchoring medium, a crank connected with the pin remote from the point, a fastening loop formed in the crank at the juncture thereof with the pin, and rotatable hand grips mounted on the crank at two points thereof.

In testimony whereof, I affix my signature, in the presence of two witnesses.

DAVID M. MORSE.

Witnesses:
SUSIE A. ROLISON,
FRANK ROLISON.